US012234559B2

(12) United States Patent
Taira et al.

(10) Patent No.: US 12,234,559 B2
(45) Date of Patent: Feb. 25, 2025

(54) ELECTRODE MATERIAL FOR ALUMINUM ELECTROLYTIC CAPACITORS AND METHOD FOR PRODUCING SAME

(71) Applicant: TOYO ALUMINIUM KABUSHIKI KAISHA, Osaka (JP)

(72) Inventors: Toshifumi Taira, Osaka (JP); Kazuya Fujimoto, Osaka (JP); Shinya Sone, Osaka (JP); Katsumi Nakashima, Osaka (JP); Ken Wada, Osaka (JP)

(73) Assignee: TOYO ALUMINIUM KABUSHIKI KAISHA, Osaka (JP)

( * ) Notice: Subject to any disclaimer, the term of this patent is extended or adjusted under 35 U.S.C. 154(b) by 0 days.

(21) Appl. No.: 18/275,835

(22) PCT Filed: Jan. 26, 2022

(86) PCT No.: PCT/JP2022/002945
§ 371 (c)(1),
(2) Date: Aug. 4, 2023

(87) PCT Pub. No.: WO2022/168712
PCT Pub. Date: Aug. 11, 2022

(65) Prior Publication Data
US 2024/0301561 A1    Sep. 12, 2024

(30) Foreign Application Priority Data
Feb. 8, 2021  (JP) ................. 2021-018442

(51) Int. Cl.
*H01G 9/052* (2006.01)
*B22F 3/10* (2006.01)
(Continued)

(52) U.S. Cl.
CPC .......... *C23C 24/106* (2013.01); *B22F 3/1007* (2013.01); *B22F 3/24* (2013.01);
(Continued)

(58) Field of Classification Search
None
See application file for complete search history.

(56) References Cited

U.S. PATENT DOCUMENTS 6,795,299 B2 * 9/2004 Naito ............ H01G 9/048
29/25.03
9,378,897 B2 * 6/2016 Taira ............ C22F 1/04
(Continued)

FOREIGN PATENT DOCUMENTS

CN    108022672 A    5/2018
EP    1 818 956 A2    8/2007
(Continued)

OTHER PUBLICATIONS

Li, Mengxiao, et al., "Effect of Sintered Aluminum Powder Layer Structure on Properties of Sintered Anode Aluminum Foil," Materials Chemistry and Physics 318 (2024) 129278 (Year: 2024).*
(Continued)

*Primary Examiner* — Daniel J. Schleis
(74) *Attorney, Agent, or Firm* — WHDA, LLP

(57) ABSTRACT

An electrode material for aluminum electrolytic capacitors is disclosed, including a sintered body of at least one powder selected from the group consisting of an aluminum powder and an aluminum alloy powder on at least one surface of an aluminum foil substrate or an aluminum alloy foil substrate, wherein (1) the sintered body has a total thickness of 50 to 900 μm, (2) the powder in the sintered body has a 10% particle size $D_{10}$ in a number-based particle size distribution of 1.0 to 1.8 μm, (3) the powder in the sintered body has a 50% particle size $D_{50}$ in the number-based particle size distribution of 2.0 to 3.5 μm, and (4) the powder in the sintered body has a 90% particle size $D_{90}$ in the number-based particle size distribution of 3.8 to 6.0 μm.

5 Claims, 8 Drawing Sheets

(51) Int. Cl.
    *B22F 3/24*         (2006.01)
    *C23C 24/10*      (2006.01)
    *H01G 9/045*     (2006.01)

(52) U.S. Cl.
    CPC ........... *H01G 9/045* (2013.01); *H01G 9/0525* (2013.01); *B22F 2003/242* (2013.01); *B22F 2201/11* (2013.01); *B22F 2301/052* (2013.01); *B22F 2304/10* (2013.01); *B22F 2998/10* (2013.01)

(56) References Cited

U.S. PATENT DOCUMENTS

| | | | |
|---|---|---|---|
| 10,079,111 B2* | 9/2018 | Taira | H01G 9/045 |
| 2009/0134767 A1 | 5/2009 | Cho et al. | |
| 2011/0053764 A1 | 3/2011 | Taira et al. | |
| 2017/0040115 A1 | 2/2017 | Taira et al. | |
| 2019/0001408 A1 | 1/2019 | Kawaguchi et al. | |

FOREIGN PATENT DOCUMENTS

| | | |
|---|---|---|
| EP | 3696835 A1 | 8/2020 |
| JP | 2000-277368 A | 10/2000 |
| JP | 2008-98279 A | 4/2008 |
| JP | 2009-135101 A | 6/2009 |
| JP | 2010-010495 A | 1/2010 |
| JP | 2011-052291 A | 3/2011 |
| JP | 2012-221855 A | 11/2012 |
| WO | 2015/098644 A1 | 7/2015 |
| WO | 2016/136804 A1 | 9/2016 |

OTHER PUBLICATIONS

International Search Report dated Apr. 5, 2022, issued in counterpart International Application No. PCT/JP2022/002945. (2 pages).

Office Action dated Sep. 22, 2024, issued in counterpart CN application No. 202280012314.6, with English translation. (12 pages).

Extended Supplementary European Search Report dated Jan. 8, 2025, issued in counterpart Application No. 22749586.8. (9 pages).

* cited by examiner

ELECTRODE MATERIAL FOR ALUMINUM ELECTROLYTIC CAPACITORS AND METHOD FOR PRODUCING SAME

TECHNICAL FIELD

The present invention relates to an electrode material for aluminum electrolytic capacitors and a method for producing the electrode material.

BACKGROUND ART

Aluminum electrolytic capacitors can provide a high capacity at a low cost and are thus widely used in the energy field. Typically, aluminum foil is used as an electrode material for aluminum electrolytic capacitors.

The surface area of aluminum foil can be increased by performing etching treatment and forming etching pits. Then, when the surface is subjected to anodization treatment, an oxide film is formed, and the film functions as a dielectric. Accordingly, by subjecting aluminum foil to etching treatment and forming an anodic oxide film on the etched surface by applying a varying voltage corresponding to the voltage to be used, various aluminum anode electrode foils for electrolytic capacitors suitable for applications can be produced.

The etching pits obtained by etching treatment are formed into a shape corresponding to an anodization voltage. Specifically, the formation of a thick oxide film is necessary for use in medium- to high-voltage capacitors. Thus, in order to prevent etching pits from being buried by such a thick oxide film, etching pits of aluminum foil for use as a medium- to high-voltage anode are formed to have a tunnel-like shape mainly by direct-current etching and to have a thickness corresponding to the voltage. In contrast, fine etching pits are necessary for use in low-voltage capacitors; thus, sponge-like etching pits are formed mainly by AC etching. The surface area of a cathode foil is also increased by etching in a similar manner.

Patent Literature (PTL) 1 proposes an electrode material for aluminum electrolytic capacitors, the electrode material being composed of a sintered body of at least aluminum or an aluminum alloy, or both. This electrode material has a surface area greater than that of a conventional aluminum foil on which etching pits are formed, and the use of the electrode material in a capacitor can increase the capacitance. PTL 1 also discloses that the use of an aluminum powder having an average particle size of 1 to 80 μm enables the production of an electrode material for aluminum electrolytic capacitors with excellent withstand voltage and capacitance.

However, the electrode material for aluminum electrolytic capacitors disclosed in PTL 1 also has a problem in terms of strength. In particular, this electrode material is susceptible to breakage during anodization. As stated above, the electrode material for aluminum electrolytic capacitors disclosed in PTL 1 is obtained by sintering a film made of a paste composition containing an aluminum powder and/or an aluminum alloy powder. In the production of an aluminum electrolytic capacitor, an aluminum anode foil (material) is usually wound into a very small diameter together with a separator and a cathode foil (material). To withstand the winding, the electrode material for aluminum electrolytic capacitors that constitutes the aluminum anode foil is required to have a high bending strength.

The bending strength of an electrode material for aluminum electrolytic capacitors can improve by increasing the particle size of the aluminum powder and/or aluminum alloy powder for use in the production of an electrode material for aluminum electrolytic capacitors. In this case, however, the surface area of the electrode material for aluminum electrolytic capacitors will be reduced, and the use of this electrode material for aluminum electrolytic capacitors in the production of an aluminum electrolytic capacitor will reduce the capacitance of the capacitor. Conversely, if the particle size of the aluminum powder and/or aluminum alloy powder is reduced to increase the capacitance of the electrode material for aluminum electrolytic capacitors, the bending strength of the electrode material for aluminum electrolytic capacitors will become insufficient.

PTL 2 discloses forming an electrode material for aluminum electrolytic capacitors by subjecting a sintered body to embossing and adjusting the surface roughness of the sintered body to be within a specific range; the thus-obtained electrode material for aluminum electrolytic capacitors is less susceptible to breakage during anodization.

However, in the method disclosed in PTL 2 as well, there is still room for improvement in terms of the capacitor capacity and production costs. The production method disclosed in PTL 2 requires embossing, which poses a problem of increasing the production costs. Another problem is that overly deep embossing causes a tendency to reduce the capacitance.

PTL 3 discloses forming an electrode material for aluminum electrolytic capacitors by using an aluminum foil substrate (aluminum foil as a substrate) to which manganese (Mn) is added; the thus-obtained electrode material is less susceptible to breakage during anodization.

However, for producing a capacitor using an electrode material that has been subjected to anodization, even the production method of PTL 3 is not sufficient to satisfactorily prevent the electrode material and anodic oxide film from being broken during the winding process. Accordingly, there is demand for an electrode material having better bending strength.

CITATION LIST

Patent Literature

PTL 1: JP2008-98279A
PTL 2: WO2016/136804
PTL 3: WO2015/098644

SUMMARY OF INVENTION

Technical Problem

An object of the present invention is to provide an electrode material for aluminum electrolytic capacitors, the electrode material being capable of exhibiting a capacitance required for capacitors and having excellent bending strength, and to provide a method for producing the electrode material.

Solution to Problem

As a result of extensive research, the present inventors found that an electrode material having excellent bending strength and a high capacitance can be produced by setting the total thickness of a sintered body to be within a specific range, and setting the 10% particle size $D_{10}$, the 50% particle size $D_{50}$, and the 90% particle size $D_{90}$ in the number-based particle size distribution to be within specific ranges. The present invention has thus been completed.

More specifically, the present invention relates to the following electrode material for aluminum electrolytic capacitors and a production method therefor.

1. An electrode material for aluminum electrolytic capacitors, comprising a sintered body of at least one powder selected from the group consisting of an aluminum powder and an aluminum alloy powder on at least one surface of an aluminum foil substrate or an aluminum alloy foil substrate, wherein
   (1) the sintered body has a total thickness of 50 to 900 μm,
   (2) the powder in the sintered body has a 10% particle size $D_{10}$ in a number-based particle size distribution of 1.0 to 1.8 μm,
   (3) the powder in the sintered body has a 50% particle size $D_{50}$ in the number-based particle size distribution of 2.0 to 3.5 μm, and
   (4) the powder in the sintered body has a 90% particle size $D_{90}$ in the number-based particle size distribution of 3.8 to 6.0 μm.

2. The electrode material for aluminum electrolytic capacitors according to Item 1, wherein the number of powder particles having a particle size of 1 μm or less in a freely selected region of 100 μm×115 μm on the surface of the sintered body is 300 or less.

3. The electrode material for aluminum electrolytic capacitors according to Item 1 or 2, further comprising an anodic oxide film on the surface of the sintered body.

4. A method for producing an electrode material for aluminum electrolytic capacitors, comprising
   (1) step 1 of forming a film of a paste composition containing at least one powder selected from the group consisting of an aluminum powder and an aluminum alloy powder on at least one surface of an aluminum foil or an aluminum alloy foil, and
   (2) step 2 of sintering the film at a temperature of 560° C. or more and 660° C. or less,
wherein
the powder has a 10% particle size $D_{10}$ in a number-based particle size distribution of 1.0 to 1.8 μm, a 50% particle size $D_{50}$ in the number-based particle size distribution of 2.0 to 3.5 μm, and a 90% particle size $D_{90}$ in the number-based particle size distribution of 3.8 to 6.0 μm.

5. The production method according to Item 4, further comprising an anodization step after step 2.

Advantageous Effects of Invention

The electrode material for aluminum electrolytic capacitors of the present invention is capable of exhibiting a capacitance required for capacitors and has excellent bending strength.

DESCRIPTION OF EMBODIMENTS

1. Electrode Material for Aluminum Electrolytic Capacitors

The electrode material for aluminum electrolytic capacitors of the present invention is an electrode material for aluminum electrolytic capacitors comprising a sintered body of at least one powder selected from the group consisting of an aluminum powder and an aluminum alloy powder on at least one surface of an aluminum foil substrate or an aluminum alloy foil substrate, wherein
  (1) the sintered body has a total thickness of 50 to 900 μm,
  (2) the powder in the sintered body has a 10% particle size $D_{10}$ in a number-based particle size distribution of 1.0 to 1.8 μm,
  (3) the powder in the sintered body has a 50% particle size $D_{50}$ in the number-based particle size distribution of 2.0 to 3.5 μm, and
  (4) the powder in the sintered body has a 90% particle size $D_{90}$ in the number-based particle size distribution of 3.8 to 6.0 μm.

The measurement of particle size distribution of a powder is typically performed on a volume basis by, for example, a laser diffraction/scattering method to obtain an average particle size $D_{50}$ on a volume basis. However, even if the volume-based average particle size $D_{50}$ is the same, the distributions vary. Further, since the measurement is performed on a volume basis, the presence (number) of fine particles is less likely to be reflected in the measurement. The powder having a particle size of 1 μm or less, which is less likely to be reflected in a volume-based particle size distribution, serves as a cause of the occurrence of cracking and decreases the bending strength of the electrode material for aluminum electrolytic capacitors.

Since the electrode material for aluminum electrolytic capacitors (also simply referred to below as "the electrode material") of the present invention has the configurations (2) to (4) above, fine powder is present in a small amount, and the formation of secondary particles, which are obtained by agglomeration of fine powder and which serve as a starting point of cracking, is suppressed. Further, since the requirement (1) above is satisfied, the bending strength can be improved. In addition, since the electrode material of the present invention has the configurations (2) to (4) above, the particle sizes of the powder are in appropriate ranges, and a high capacitance can be exhibited.

Figure 1:
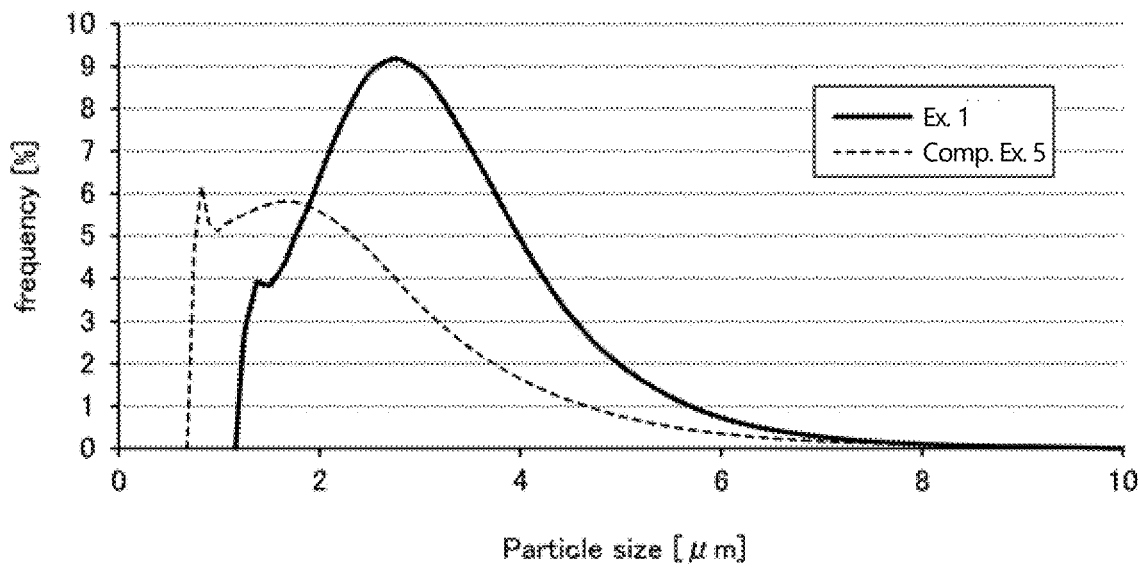
FIG. 1 is a graph showing the number-based particle size distributions of the powders used in Example 1 and Comparative Example 5.

FIG. 1 is a graph showing the number-based particle size distributions of the powders used in Example 1 and Comparative Example 5 of the present invention. In FIG. 1, almost no peak is observed in the region in which the particle size is small (2 μm or less) in the particle size distribution of the powder used in Example 1, indicating the presence of a small amount of particles having a small particle size. In contrast, a large peak is observed at 0.81 μm in the particle size distribution of the powder used in Comparative Example 5, indicating the presence of a large amount of particles having a small particle size.

Figure 2:
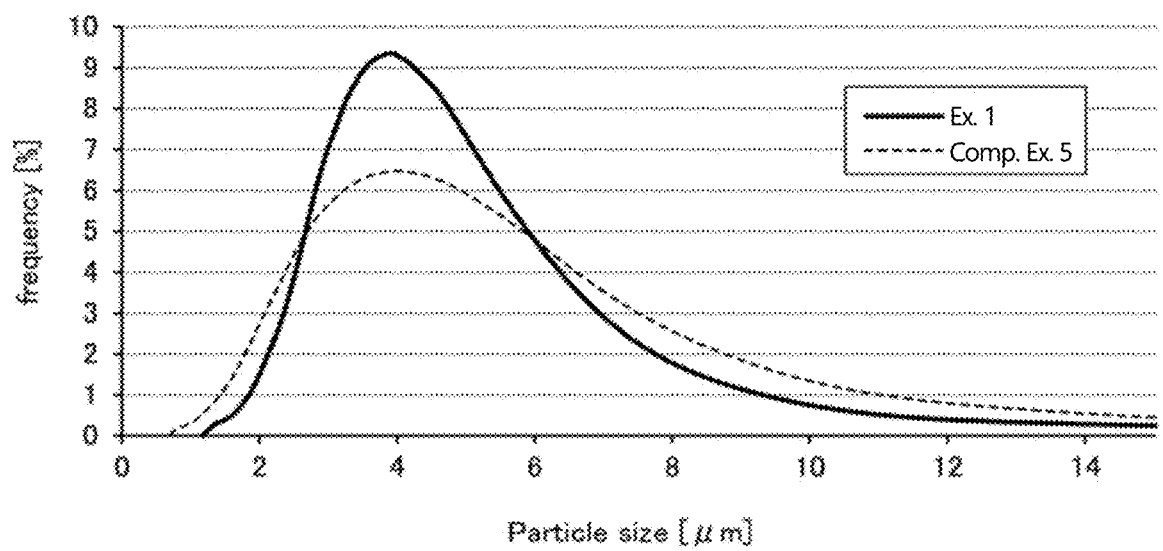
FIG. 2 is a graph showing the volume-based particle size distributions of the powders used in Example 1 and Comparative Example 5.

FIG. 2 is a graph showing the volume-based particle size distributions of the powders used in Example 1 and Comparative Example 5 of the present invention. In FIG. 2, no peak is observed in the region in which the particle size is small (2 μm or less) in both of the powders used in Example 1 and Comparative Example 5; thus, the presence of particles having a small particle size is unknown from the volume-based particle size distributions.

The electrode material of the present invention is described in detail below.

Sintered Body

The electrode material of the present invention comprises a sintered body of at least one powder selected from the group consisting of an aluminum powder and an aluminum alloy powder on at least one surface of an aluminum foil substrate.

The sintered body may be formed on at least one surface of the aluminum foil substrate, and may be formed on both surfaces thereof. From the viewpoint of further improving the capacitance of the electrode material, the sintered body is preferably formed on both surfaces.

The sintered body is preferably a porous sintered body having a three-dimensional network structure in which the powder particles are sintered and bonded to each other while maintaining voids. By having such a structure, the surface area of the sintered body is increased, making it possible to obtain an electrode material that is capable of producing an aluminum electrolytic capacitor (also simply referred to below as a "capacitor") exhibiting a high capacitance.

The aluminum content in the aluminum powder is preferably 99.80 mass % or more, more preferably 99.85 mass % or more, and still more preferably 99.99 mass % or more.

The aluminum alloy powder may contain one or more elements selected from silicon (Si), iron (Fe), copper (Cu), manganese (Mn), magnesium (Mg), chromium (Cr), zinc (Zn), titanium (Ti), vanadium (V), gallium (Ga), nickel (Ni), boron (B), zirconium (Zr), and the like. The content of these elements in the aluminum alloy is preferably 100 ppm by mass or less, and more preferably 50 ppm by mass or less. When the content of the elements in the aluminum alloy powder is within the above range, the capacitance of the electrode material for aluminum electrolytic capacitors is further improved.

The powders may be used alone or as a mixture of two or more thereof.

The 50% particle size $D_{50}$ in the number-based particle size distribution (also referred to below as the "number-based particle size $D_{50}$" or "$D_{50}$") of the powder in the sintered body is 2.0 μm or more and 3.5 μm or less. If the number-based particle size $D_{50}$ is less than 2.0 μm or exceeds 3.5 μm, the capacitance of the electrode material is insufficient. The number-based particle size $D_{50}$ of the powder in the sintered body is preferably 2.2 μm or more and 3.3 μm or less, more preferably 2.3 μm or more and 3.0 μm or less, and still more preferably 2.4 μm or more and 2.8 μm or less.

In this specification, the number-based particle size $D_{50}$ of the powder in the sintered body can be measured by observing the cross section of the sintered body with a scanning electron microscope. Specifically, a sintered body is formed by sintering the powder. The obtained sintered body is in a state in which powder particles are partly sintered and are bonded to each other. In the cross-section of the sintered body, the maximum diameter (major diameter) of a powder particle in the bonding state is defined as the particle size of this powder particle, and the particle sizes and the number of all of the particles in a specific area in a cross-sectional image are determined. All of these particles are arranged in ascending order of the particle size, and the particle size at which the number of the particles is 50% is defined as the number-based particle size $D_{50}$ of the powder in the sintered body. In addition, the particle sizes at which the numbers of the particles are 10% and 90% are respectively defined as the following number-based particle sizes $D_{10}$ and $D_{90}$ of the powder in the sintered body.

The number-based particle size $D_{10}$ of the powder in the sintered body is 1.0 µm or more and 1.8 µm or less. If the number-based particle size $D_{10}$ is less than 1.0 µm, the amount of fine powder in the powder in the sintered body increases, the number of secondary particles, which can serve as a cause of cracking, increases, and the bending strength of the electrode material decreases. If the number-based particle size $D_{10}$ exceeds 1.8 µm, the yield in the production process of the aluminum powder as a starting material decreases, and the cost increases. The number-based particle size $D_{10}$ of the powder in the sintered body is preferably 1.3 µm or more and 1.7 µm or less, and more preferably 1.4 µm or more and 1.5 µm or less, from the viewpoint of bending strength and cost.

The number-based particle size $D_{90}$ of the powder in the sintered body is 3.8 µm or more and 6.0 µm or less. If the number-based particle size $D_{90}$ is less than 3.8 µm, the yield in the production process of the aluminum powder as a starting material decreases, and the cost increases. If the number-based particle size $D_{90}$ exceeds 6.0 µm, the surface area of the sintered body is insufficient, and the capacitance is insufficient for an electrode material for capacitors. The number-based particle size $D_{90}$ of the powder in the sintered body is preferably 3.9 µm or more and 5.0 µm or less, and more preferably 3.9 µm or more and 4.5 µm or less, from the viewpoint of capacitance for an electrode material for capacitors.

The number-based particle sizes $D_{10}$, $D_{50}$, and $D_{90}$ of the powder in the sintered body measured by the measurement method described above are almost unchanged from and are substantially the same as the number-based particle sizes $D_{10}$, $D_{50}$, and $D_{90}$ of the powder before sintering. Thus, the measurement values of the number-based particle sizes $D_{10}$, $D_{50}$, and $D_{90}$ of the powder before sintering can be defined as the number-based particle sizes $D_{10}$, $D_{50}$, and $D_{90}$ of the powder in the sintered body. In this specification, the number-based particle sizes $D_{10}$, $D_{50}$, and $D_{90}$ of the powder before sintering can be determined by measuring the particle size distribution on a number basis by a laser diffraction/scattering method by a wet method using a Microtrac MT3300 EXII (produced by Nikkiso Co., Ltd.) and calculating the $D_{10}$ value, the $D_{50}$ value, and the $D_{90}$ value.

The powder in which $D_{10}$, $D_{50}$, and $D_{90}$ in the number-based particle size distribution are in the above ranges can be obtained by classifying atomized aluminum powder by a method such as vortex classification or sieve classification. Specifically, the powder can be obtained by, for example, (1) a method of classifying atomized aluminum powder by using a combination of a classifier in which $D_{10}$ falls within the above range, a classifier in which $D_{50}$ falls within the above range, and a classifier in which $D_{90}$ falls within the above range, or (2) a method of classifying atomized aluminum powder by a method such as vortex classification or sieve classification to prepare an aluminum powder in which $D_{10}$ falls within the above range, an aluminum powder in which $D_{50}$ falls within the above range, and an aluminum powder in which $D_{90}$ falls within the above range, and mixing them.

The total thickness of the sintered body is 50 µm or more and 900 µm or less. If the total thickness of the sintered body is less than 50 µm, the capacitance of the electrode material is insufficient. Forming a sintered body having a total thickness exceeding 900 µm is difficult. The total thickness of the sintered body is preferably 70 µm or more, and more preferably 100 µm or more. The total thickness of the sintered body is preferably 875 µm or less, more preferably 860 µm or less, still more preferably 500 µm or less, and particularly preferably 300 µm or less. In this specification, when the electrode material of the present invention has the sintered body on both surfaces of the aluminum foil substrate, the total thickness of the sintered body is the sum of the thicknesses of the sintered bodies formed on both surfaces. When the electrode material of the present invention has the sintered body on only one surface of the aluminum foil substrate, the total thickness is the thickness of the sintered body on one surface.

The number of powder particles having a particle size of 1 µm or less in a freely selected region of 100 µm×115 µm on the surface of the sintered body is preferably 300 or less, more preferably 250 or less, still more preferably 200 or less, and particularly preferably 180 or less. When the upper limit of the number of the powder particles having a particle size of 1 µm or less is within the above range, the amount of fine powder particles in the powder in the sintered body is reduced, an increase in the number of secondary particles, which can serve as a cause of cracking, is suppressed, and the bending strength of the electrode material of the present invention is further improved. Thus, when the electrode material is used as an electrode for a capacitor, breakage in an anodization line or in a winding process can be further suppressed. The lower limit of the number of powder particles having a particle size of 1 µm or less is preferably as small as possible, but the number may be 0, 50 or more, or 100 or more.

In this specification, the number of powder particles having a particle size of 1 µm or less in a freely selected region of 100 µm×115 µm on the surface of the sintered body can be measured by subjecting an image of the surface of the sintered body photographed with a scanning electron microscope to image processing using image analysis software, analyzing it, and counting the number of the powder particles having a particle size of 1 µm or less in the freely selected region of 100 µm×115 µm on the surface of the sintered body. The details are given below.

Photographing with a scanning electron microscope is performed using a scanning electron microscope (product number: JSM-5510) produced by JEOL Ltd. under the conditions of a secondary electron image, an imaging magnification of 1500 times, an acceleration voltage of 15 kV, a spot diameter of 15, and an operating distance of 20 mm.

Next, the number of the powder particles having a particle size of 1 µm or less on the surface of the sintered body layer is calculated using WinROOF 2015 image analysis software produced by Mitani Corporation. Specifically, the image taken with a scanning electron microscope is loaded into the software as a JPEG image, and monochrome processing and then binarization processing are performed. Thereafter, the equivalent circle diameter of a powder particle is defined as the particle size of this powder particle, and the number of the powder particles having a particle size of 1 µm or less is counted in a freely selected region of 100 µm×115 µm in the image.

Aluminum Foil Substrate and Aluminum Alloy Foil Substrate

The electrode material of the present invention comprises an aluminum foil substrate or an aluminum alloy foil substrate (these are also collectively referred to as "the substrate").

The aluminum foil used for forming the aluminum foil substrate is preferably an aluminum foil made of pure aluminum.

The aluminum content in the aluminum foil made of pure aluminum is preferably 99.80 mass % or more, more preferably 99.85 mass % or more, and still more preferably 99.99 mass % or more.

The aluminum alloy used for the aluminum alloy foil for forming the aluminum alloy foil substrate may be an aluminum alloy obtained by adding to aluminum at least one metal element selected from the group consisting of silicon (Si), iron (Fe), copper (Cu), manganese (Mn), magnesium (Mg), chromium (Cr), zinc (Zn), titanium (Ti), vanadium (V), gallium (Ga), nickel (Ni), and boron (B) within required ranges, or may be an aluminum alloy containing at least one element above as an inevitable impurity. The content of these elements in the aluminum alloy is preferably 100 ppm by mass or less, and more preferably 50 ppm by mass or less. When the content of the elements in the aluminum alloy is within the above range, the capacitance of the electrode material for aluminum electrolytic capacitors is further improved.

The thickness of the substrate is preferably 10 µm or more, more preferably 15 µm or more, and still more preferably 20 µm or more, from the viewpoint of further improving the strength of the electrode material. The thickness of the aluminum foil substrate is preferably 80 µm or less, more preferably 60 µm or less, and still more preferably 40 µm or less, from the viewpoint of further improving the capacity per volume for an electrode material for capacitors.

Anodic Oxide Film

The electrode material of the present invention may further comprise an anodic oxide film on the surface of the sintered body. The anodic oxide film present on the surface of the sintered body functions as a dielectric, whereby the electrode material of the present invention can be usefully used as an electrode material for aluminum electrolytic capacitors.

The anodic oxide film can be produced by anodizing the surface of the sintered body. The anodic oxide film functions as a dielectric film.

The thickness of the anodic oxide film is preferably 0.2 to 1.1 µm, and more preferably 0.3 to 1.05 µm.

The film withstand voltage of the anodic oxide film is preferably 250 to 800 V, and more preferably 300 to 800 V. The film withstand voltage of the anodic oxide film can be measured by a measurement method in accordance with RC-2364A established by the Electronic Industries Association of Japan.

2. Method for Producing an Electrode Material for Aluminum Electrolytic Capacitors The method of producing an electrode material for aluminum electrolytic capacitors of the present invention comprises (1) step 1 of forming a film of a paste composition containing at least one powder selected from the group consisting of an aluminum powder and an aluminum alloy powder on at least one surface of an aluminum foil substrate or an aluminum alloy foil substrate, and (2) step 2 of sintering the film at a temperature of 560° C. or more and 660° C. or less, wherein the powder has a 10% particle size $D_{10}$ in a number-based particle size distribution of 1.0 to 1.8 µm, a 50% particle size $D_{50}$ in the number-based particle size distribution of 2.0 to 3.5 µm, and a 90% particle size $D_{90}$ in the number-based particle size distribution of 3.8 to 6.0 µm. The details are given below.

Step 1

Step 1 is (1) a step of forming a film of a paste composition containing at least one powder selected from the group consisting of an aluminum powder and an aluminum alloy powder on at least one surface of an aluminum foil substrate or an aluminum alloy foil substrate (these are also collectively referred to below as "the substrate").

The aluminum powder as a starting material is preferably, for example, an aluminum powder having an aluminum purity of 99.80 mass % or more, more preferably 99.85 mass % or more, and still more preferably 99.99 mass& or more. The alloy of the aluminum alloy powder as a starting material preferably contains one or more elements selected from, for example, silicon (Si), iron (Fe), copper (Cu), manganese (Mn), magnesium (Mg), chromium (Cr), zinc (Zn), titanium (Ti), vanadium (V), gallium (Ga), nickel (Ni), boron (B), zirconium (Zr), and the like. The content of these elements in the aluminum alloy is preferably 100 ppm by mass or less, and particularly preferably 50 ppm by mass or less.

These powders may be used alone or as a mixture of two or more thereof.

The 50% particle size $D_{50}$ in the number-based particle size distribution of the powder is 2.0 µm or more and 3.5 µm or less. If the number-based particle size $D_{50}$ is less than 2.0 µm or exceeds 3.5 µm, the produced electrode material does not achieve sufficient capacitance. The number-based particle size $D_{50}$ of the powder is preferably 2.2 µm or more and 3.3 µm or less, more preferably 2.3 µm or more and 3.0 µm or less, and still more preferably 2.4 µm or more and 2.8 µm or less.

The number-based particle size $D_{10}$ of the powder is 1.0 µm or more and 1.8 µm or less. If the number-based particle size $D_{10}$ is less than 1.0 µm, the amount of fine powder in the powder increases, the number of secondary particles, which can serve as a cause of cracking, increases, and the bending strength of the produced electrode material decreases. If the number-based particle size $D_{10}$ exceeds 1.8 µm, the yield in the production process of the aluminum powder as a starting material decreases, and the cost increases. The number-based particle size $D_{10}$ of the powder is preferably 1.3 µm or more and 1.7 µm or less, and more preferably 1.4 µm or more and 1.5 µm or less, from the viewpoint of bending strength and cost.

The number-based particle size $D_{90}$ of the powder is 3.8 µm or more and 6.0 µm or less. If the number-based particle size $D_{90}$ is less than 3.8 µm, the yield in the production process of the aluminum powder as a starting material decreases, and the cost increases. If the number-based particle size $D_{90}$ exceeds 6.0 µm, the surface area of the sintered body is insufficient, and the capacitance is insufficient for an electrode material for capacitors. The number-based particle size $D_{90}$ of the powder is preferably 3.9 µm or more and 5.0 µm or less, and more preferably 3.9 µm or more and 4.5 µm or less, from the viewpoint of the capacitance for an electrode material for capacitors.

The number-based particle sizes $D_{10}$, $D_{50}$, and $D_{90}$ of the powder can be determined by measuring the particle size distribution on a number basis by a laser diffraction/scattering method by a wet method using a Microtrac MT3300 EXII (produced by Nikkiso Co., Ltd.) and calculating the $D_{10}$ value, the $D_{50}$ value, and the $D_{90}$ value.

The powder in which $D_{10}$, $D_{50}$, and $D_{90}$ in the number-based particle size distribution are in the above ranges can be obtained by classifying atomized aluminum powder by a method such as vortex classification or sieve classification. Specifically, the powder can be obtained by, for example, (1) a method of classifying atomized aluminum powder by using a combination of a classifier in which $D_{10}$ falls within the above range, a classifier in which $D_{50}$ falls within the above range, and a classifier in which $D_{90}$ falls within the above range, or (2) a method of classifying atomized aluminum powder by a method such as vortex classification or sieve classification to prepare an aluminum powder in which $D_{10}$ falls within the above range, an aluminum powder in which $D_{50}$ falls within the above range, and an aluminum powder in which $D_{90}$ falls within the above range, and mixing them.

The shapes of the aluminum powder and aluminum alloy powder are not particularly limited; and any of spherical, amorphous, scaly, and fibrous shapes are suitably used. For industrial production, a powder of spherical particles is particularly preferable.

The paste composition may contain a resin binder. The resin binder may be widely selected from known resin binders. Examples of suitable resin binders include carboxy-modified polyolefin resins, vinyl acetate resins, vinyl chloride resins, vinyl chloride-vinyl acetate copolymers, vinyl alcohol resins, butyral resins, polyvinyl fluoride resins, acrylic resins, polyester resins, urethane resins, epoxy resins, urea resins, phenol resins, acrylonitrile resins, cellulose resins, paraffin wax, polyethylene wax, and other synthetic resins; waxes, tar, glue, sumac, pine resin, beeswax, and other natural resins; and waxes. These resin binders include those that volatilize by heating, and those that remain as a residue with aluminum powder due to pyrolysis by heating, depending on the molecular weight, type of resin, etc. The resin binders may be used properly according to the desired electrical characteristics, such as capacitance.

The content of the resin binder in the paste composition is preferably 0.5 to 10 mass %, and more preferably 0.75 to 5 mass %, per 100 mass % of the paste composition. When the amount of the resin binder in the paste composition is 0.5 mass % or more, the adhesion strength between the substrate and the unsintered laminate can improve. On the other hand, when the amount of the resin binder is 10 mass % or less, degreasing is easily performed in the sintering step and the degreasing step, and defects due to the remaining resin binder can be reduced.

Additionally, the paste composition may optionally further contain a solvent, a sintering aid, a surfactant, etc., that are known or commercially available products, whereby a film can be formed efficiently.

The solvent may be widely selected from known solvents. Examples of usable solvents include water and organic solvents, such as toluene, alcohols, ketones, and esters.

The sintering aid may also be widely selected from known sintering aids. Examples of usable sintering aids include aluminum fluoride, potassium fluoride, and the like.

The surfactant may also be widely selected from known surfactants. Examples of usable surfactants include betaine-based surfactants, sulfobetaine-based surfactants, alkylbetaine-based surfactants, and the like.

When the paste composition is adhered to one surface or both surfaces of the substrate to form a film of the paste composition, the total thickness of the film is preferably 50 μm or more and 900 μm or less. The total thickness of the film is preferably 70 μm or more, and more preferably 100 μm or more. The total thickness of the film is preferably 875 μm or less, more preferably 860 μm or less, still more preferably 500 μm or less, and particularly preferably 300 μm or less. In this specification, when the film is formed on both surfaces of the substrate in step 1, the total thickness of the film is the sum of the thicknesses of the films formed on both surfaces of the substrate. When the film is formed on only one surface of the substrate in step 1, the total thickness is the thickness of the film on one surface.

The method of forming a film on the substrate is not particularly limited. For example, a film can be formed by a method of applying the paste composition by die coating, gravure coating, direct coating, rolling, brushing, spraying, dipping, or the like; or by a known printing method, such as silk-screen printing.

It is also preferable to dry the film adhered to the substrate together with the substrate at a temperature in the range of 20 to 300° C. for 1 to 30 minutes as necessary.

Step 2

Step 2 is (2) a step of sintering the film at a temperature of 560° C. or more and 660° C. or less.

In step 2, the powder in the film is sintered to form a sintered body on the substrate. The sintering temperature is 560° C. or more and 660° C. or less. If the sintering temperature is less than 560° C., sintering does not proceed, and a desired capacitance cannot be obtained. If the sintering temperature exceeds 660° C., the powder melts and sufficient capacity cannot be obtained when the resulting product is used as an electrode material for electrolytic capacitors. The sintering temperature is preferably 570° C. or more and less than 650° C., and more preferably 580° C. or more and less than 620° C.

Although the sintering time is affected by the sintering temperature etc., the sintering time can usually be appropriately determined within the range of about 5 to 24 hours. The sintering atmosphere is not particularly limited. Examples include a vacuum atmosphere, an inert gas atmosphere, an oxidizing gas atmosphere (air), a reducing atmosphere, and the like. In particular, a vacuum atmosphere or a reducing atmosphere is preferable. Further, the pressure conditions may be any of normal pressure, reduced pressure, and increased pressure.

Degreasing Step

In the production method of the present invention, before step 2, a degreasing step is preferably performed for the purpose of vaporizing the resin binder in the film. Examples of the degreasing step include a step of performing heating at 200 to 500° C. for 1 to 20 hours in an oxidizing gas atmosphere (air). When the lower limit of the heating temperature or the lower limit of the heating time is within the above ranges, the resin binder in the film is further vaporized, and the residue of the resin binder in the film can be reduced. Further, when the upper limit of the heating temperature or the upper limit of the heating time is within the above ranges, excessive progress of sintering of the aluminum powder in the film can be suppressed, and further sufficient capacity is obtained when the resulting product is used as an electrode material for an electrolytic capacitor.

Anodization Step

The production method of the present invention may further comprise an anodization step after step 2. In the anodization step, an anodic oxide film is formed on the surface of the sintered body, and the anodic oxide film functions as a dielectric, whereby the electrode material can be usefully used as an electrode material for aluminum electrolytic capacitors.

The anodization conditions are not particularly limited. The anodization may be performed with respect to an electrode material that has undergone step 1 and step 2 usually by applying a current of 10 mA/cm$^2$ or more and 400 mA/cm$^2$ or less for 5 minutes or more in an aqueous boric acid solution or an aqueous ammonium adipate solution at a temperature of 30° C. or more and 100° C. or less with a concentration of 0.01 mol or more and 5 mol or less. The anodization as described above is usually performed while feeding an electrode material using one or more rolls on a production line.

In the anodization step, the voltage is preferably selected from 250 to 800 V. The voltage is preferably a processing voltage corresponding to the operating voltage of the aluminum electrolytic capacitor obtained by using the resulting product as an aluminum electrolytic capacitor electrode.

According to the method for producing the electrode material of the present invention, an excellent electrode material can be obtained without performing etching treatment. This method, which does not include an etching step, requires no treatment for hydrochloric acid etc. for use in etching, thus achieving a further reduction in environmental and economic burden.

Method for Producing an Electrolytic Capacitor

An electrolytic capacitor can be produced using the electrode material of the present invention. Examples of the method for producing an electrolytic capacitor include the following method. Specifically, the electrode material of the present invention is used as an anode foil, and this anode foil and a cathode foil are laminated with a separator therebetween, and the laminate is wound to form a capacitor element. The capacitor element is impregnated with an electrolyte, the capacitor element containing the electrolyte is housed in an outer case, and the outer case is sealed with a sealing material.

Although embodiments of the present invention are described above, the present invention is not limited to these embodiments. It is evident to those skilled in the art that various modifications can be made without departing from the spirit and principal concepts of the invention.

EXAMPLES

The present invention is described in more detail below with reference to Examples and Comparative Examples. However, the present invention is not limited to the examples.

Example 1

Step 1

A resin binder solution containing 5 mass % of ethyl cellulose binder resin was prepared by adding ethyl cellulose binder resin to butyl acetate as a solvent. To 60 parts by mass of the resin binder solution, 100 parts by mass of aluminum powder (JIS A1080) having particle sizes in the number-based particle size distribution of 1.4 µm ($D_{10}$ value), 2.5 µm ($D_{50}$ value), and 4.0 µm ($D_{90}$ value) was added, and the mixture was kneaded to prepare a paste composition. The obtained paste composition was applied to both surfaces of a 30-µm-thick aluminum foil (aluminum: 99.99 wt %) using a comma direct coater so that the paste composition was adhered (thickness: 50 µm) to both surfaces of the aluminum foil to form films. Subsequently, drying was performed at 100° C. for 1.5 minutes to obtain an unsintered laminate. The particle sizes in the number-based particle size distribution of the aluminum powder before sintering were determined by measuring the particle size distribution on a number basis by a laser diffraction/scattering method by a wet method using a Microtrac MT3300 EXII (produced by Nikkiso Co., Ltd.) and calculating the $D_{10}$ value, the $D_{50}$ value, and the $D_{90}$ value. The number-based particle sizes $D_{10}$, $D_{50}$, and $D_{90}$ of the powder in the sintered body were almost unchanged from and were substantially the same as the number-based particle size $D_{50}$ of the powder before sintering. Thus, the measurement values of the number-based particle sizes $D_{10}$, $D_{50}$, and $D_{90}$ of the aluminum powder before sintering were defined as the number-based particle sizes $D_{10}$, $D_{50}$, and $D_{90}$ of the aluminum powder in the sintered body.

Step 2

The unsintered laminate obtained in step 1 was heated at 615° C. for 5 hours in an argon gas atmosphere to sinter the composition to form a sintered body on the aluminum foil substrate to thus produce an electrode material. The thickness of the sintered body after sintering was measured to confirm that the thickness did not change from the thickness of the paste composition of the unsintered laminate before sintering.

In the cross-section of the sintered body, the maximum diameter (major diameter) of a powder particle in the bonding state was defined as the particle size of this powder particle, and the particle sizes and the number of all of the particles in a specific area in a cross-sectional image were determined. All of these particles were arranged in ascending order of the particle size, and the particle size at which the number of the particles was 50% was defined as the number-based particle size $D_{50}$ of the powder in the sintered body. In addition, the particle sizes at which the numbers of the particles were 10% and 90% were respectively defined as the following number-based particle sizes $D_{10}$ and $D_{90}$ of the powder in the sintered body. The particle size $D_{50}$ of the powder measured by the measurement method above was almost unchanged from and was substantially the same as the particle size $D_{50}$ of the powder before sintering.

Figure 3:
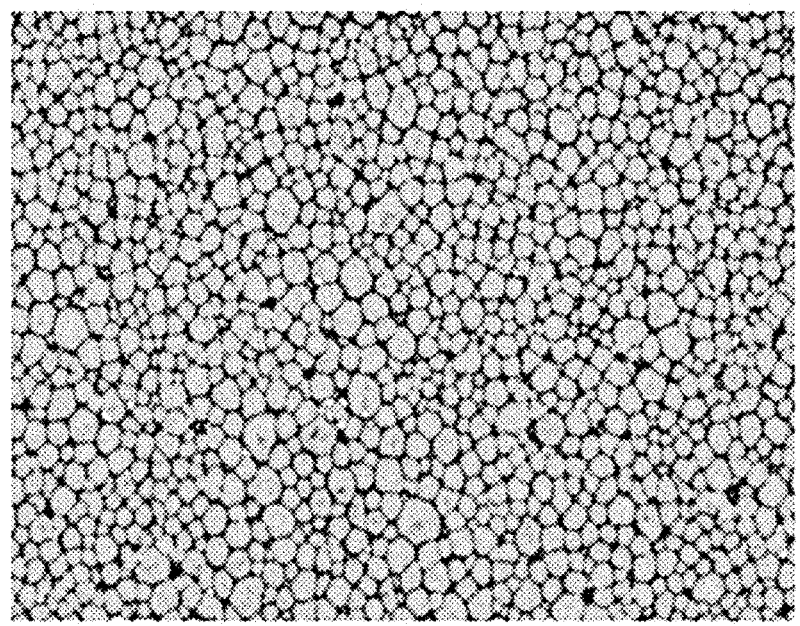
FIG. 3 is an image obtained by photographing the surface of the sintered body of the electrode material produced in Example 1 with a scanning electron microscope (SEM) and performing image processing with image analysis software.
Figure 4:
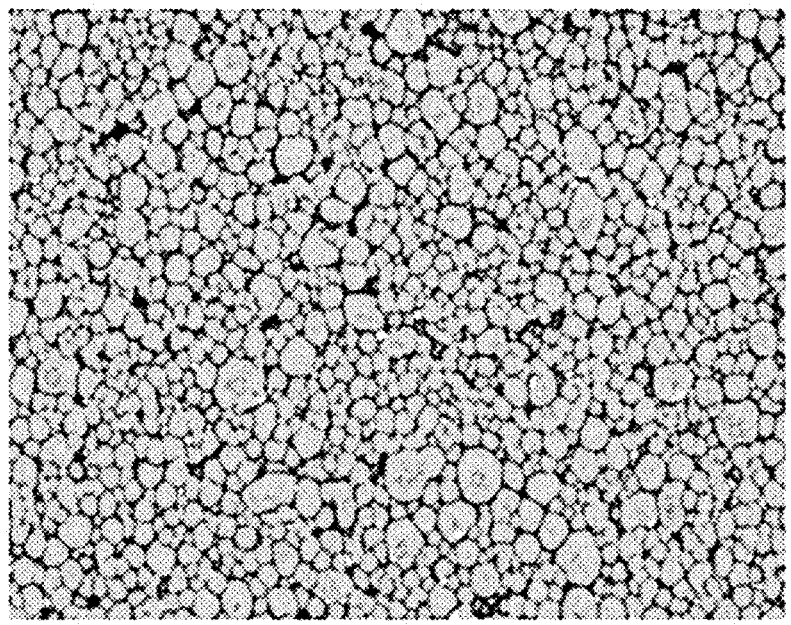
FIG. 4 is an image obtained by photographing the surface of the sintered body of the electrode material produced in Example 2 with a scanning electron microscope (SEM) and performing image processing with image analysis software.
Figure 5:
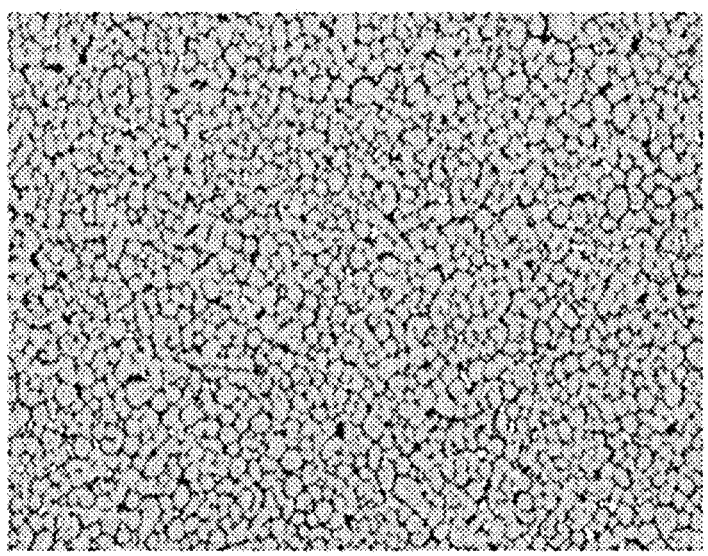
FIG. 5 is an image obtained by photographing the surface of the sintered body of the electrode material produced in Comparative Example 1 with a scanning electron microscope (SEM) and performing image processing with image analysis software.
Figure 6:
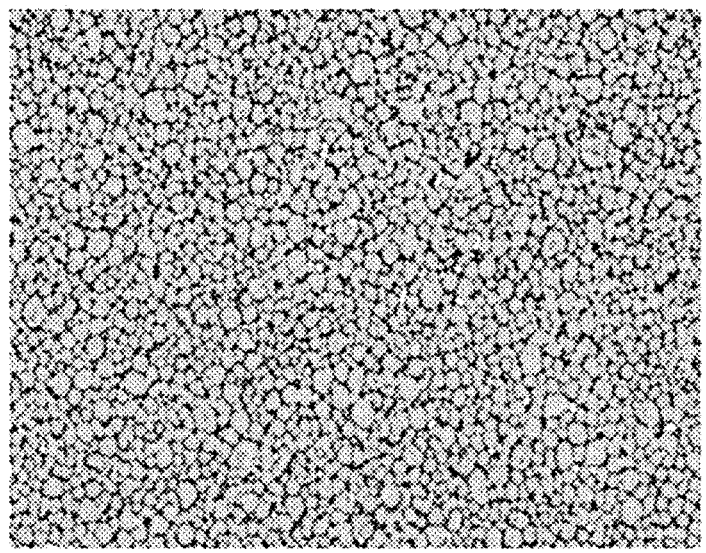
FIG. 6 is an image obtained by photographing the surface of the sintered body of the electrode material produced in Comparative Example 5 with a scanning electron microscope (SEM) and performing image processing with image analysis software.

An image of the surface of the sintered body photographed with a scanning electron microscope was subjected to image processing using image analysis software, analysis was made, and the number of the powder particles having a particle size of 1 µm or less in a freely selected region of 100 µm×115 µm on the surface of the sintered body was counted for the measurement. FIGS. 3 to 6 are images obtained by photographing the surface of the sintered body with a scanning electron microscope and subjecting them to image processing using image analysis software. FIG. 3 is an image of Example 1, FIG. 4 is an image of Example 2, FIG. 5 is an image of Comparative Example 1, and FIG. 6 is an image of Comparative Example 5.

Step 3

The produced electrode material was further subjected to anodization. The anodization was performed at a chemical conversion voltage of 250 to 800 V in accordance with RC-2364A established by the Electronic Industries Association of Japan.

Examples 2 to 5 and Comparative Examples 1 to 7

Electrode materials were produced and anodization was performed in the same manner as in Example 1 except that the powder was changed to the powders shown in Table 1, and the thickness of the sintered body was changed to the thicknesses shown in Table 1.

TABLE 1

| | Powder used | Number-based particle size (μm) | | | Number of particles having a particle size of 1 μm or less | Lamination thickness (μm) (sintered body/substrate/sintered body) |
|---|---|---|---|---|---|---|
| | | D10 | D50 | D90 | | |
| Ex. 1 | A-1 | 1.4 | 2.5 | 4.0 | 156 | 50/30/50 |
| Ex. 2 | A-2 | 1.0 | 2.0 | 3.8 | 300 | 50/30/50 |
| Ex. 3 | B | 1.8 | 3.5 | 6.0 | 156 | 50/30/50 |
| Ex. 4 | A-1 | 1.4 | 2.5 | 4.0 | 160 | 450/30/450 |
| Ex. 5 | A-1 | 1.4 | 2.5 | 4.0 | 145 | 25/30/25 |
| Comp. Ex. 1 | C | 0.4 | 0.6 | 2.4 | 359 | 50/30/50 |
| Comp. Ex. 2 | C | 0.4 | 0.6 | 2.4 | 355 | 450/30/450 |
| Comp. Ex. 3 | C | 0.4 | 0.6 | 2.4 | 358 | 25/30/25 |
| Comp. Ex. 4 | D | 1.9 | 3.6 | 6.4 | 183 | 50/30/50 |
| Comp. Ex. 5 | E | 0.8 | 1.5 | 3.1 | 383 | 50/30/50 |
| Comp. Ex. 6 | A-3 | 1.0 | 1.9 | 4.0 | 320 | 50/30/50 |
| Comp. Ex. 7 | A-4 | 1.0 | 2.2 | 3.7 | 295 | 50/30/50 |

For reference, Table 2 shows the volume-based particle sizes of the powders used in A-1 and C.

TABLE 2

| Powder used | Volume-based particle size (μm) | | |
|---|---|---|---|
| | D10 | D50 | D90 |
| A-1 | 2.40 | 3.82 | 6.44 |
| C | 1.79 | 3.12 | 5.68 |

Capacitance Evaluation Test

In accordance with RC-2364A established by the Electronic Industries Association of Japan, a capacitance evaluation test was conducted with respect to the electrode materials of the Examples and Comparative Examples.

Bending Strength Evaluation Test

Figure 7:
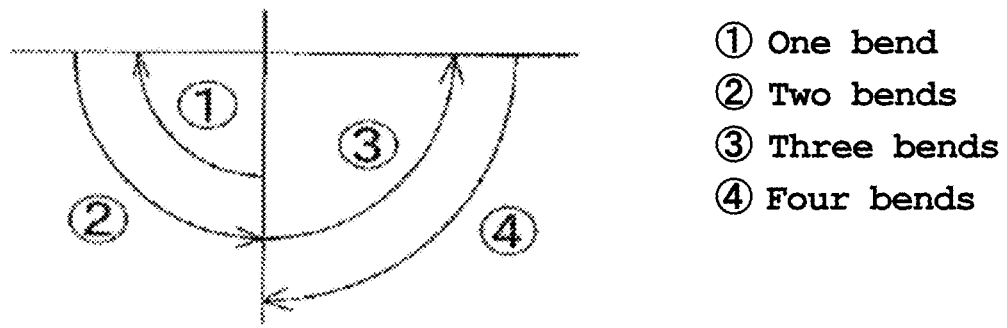
FIG. 7 is a diagram illustrating a test method of a bending strength evaluation test.

The bending strength of the electrode materials after the chemical conversion treatment was measured in accordance with the MIT Automatic Bending Test Method established by the Electronic Industries Association of Japan (EIAJ RC-2364A). The test was conducted using the MIT Automatic Bending Tester specified in JIS P8115. In this test, bending was performed multiple times until the electrode material was broken. The number of bends was counted as shown in FIG. 7. Specifically, bending a test piece at 90° was counted as one bend. When the test piece was returned to its original position, the number of bends was two. Then, when the test piece was bent at 90° toward the opposite direction, the number of bends was three. When the test piece was returned again to its original position, the number of bends was four. From the count of five onward, the bending operations were repeated as in numbers one to four until the electrode material was broken. The "Bending strength" column in Table 3 shows the number of bending operations (the number of bends) repeated until the electrode material was broken.

Table 3 shows the results.

TABLE 3

| | Bending strength (times) | Capacitance (μF/cm²) | | | |
|---|---|---|---|---|---|
| | | 250 V | 400 V | 550 V | 800 V |
| Ex. 1 | 134 | 2.78 | 1.68 | 1.06 | 0.61 |
| Ex. 2 | 116 | 2.75 | 1.66 | 1.03 | 0.58 |
| Ex. 3 | 103 | 2.77 | 1.66 | 1.04 | 0.56 |
| Ex. 4 | 7 | 20.0 | 12.1 | 6.71 | 4.06 |
| Ex. 5 | 157 | 1.39 | 0.83 | 0.56 | 0.36 |
| Comp. Ex. 1 | 58 | 2.31 | 1.39 | 0.86 | 0.45 |
| Comp. Ex. 2 | 0 | 16.7 | 9.9 | 5.45 | 3.15 |
| Comp. Ex. 3 | 57 | 1.15 | 0.68 | 0.44 | 0.26 |
| Comp. Ex. 4 | 68 | 2.44 | 1.41 | 0.88 | 0.44 |
| Comp. Ex. 5 | 62 | 2.76 | 1.43 | 0.74 | 0.36 |
| Comp. Ex. 6 | 116 | 2.35 | 1.36 | 0.83 | 0.44 |
| Comp. Ex. 7 | 116 | 2.45 | 1.32 | 0.81 | 0.40 |

The results of Table 3 confirmed that the electrode materials of the Examples exhibited the capacitance required for capacitors and had excellent bending strength, unlike the electrode materials of the corresponding Comparative Examples.

FIG. 1 is a graph showing the number-based particle size distributions of the powders used in Example 1 and Comparative Example 5. In FIG. 1, almost no peak was observed in the region in which the particle size was small (2 μm or less) in the particle size distribution of the powder used in Example 1, indicating the presence of a small amount of particles having a small particle size. In contrast, a large peak was observed at 0.81 μm in the particle size distribution of the powder used in Comparative Example 5, indicating the presence of a large amount of particles having a small particle size.

Figure 8:
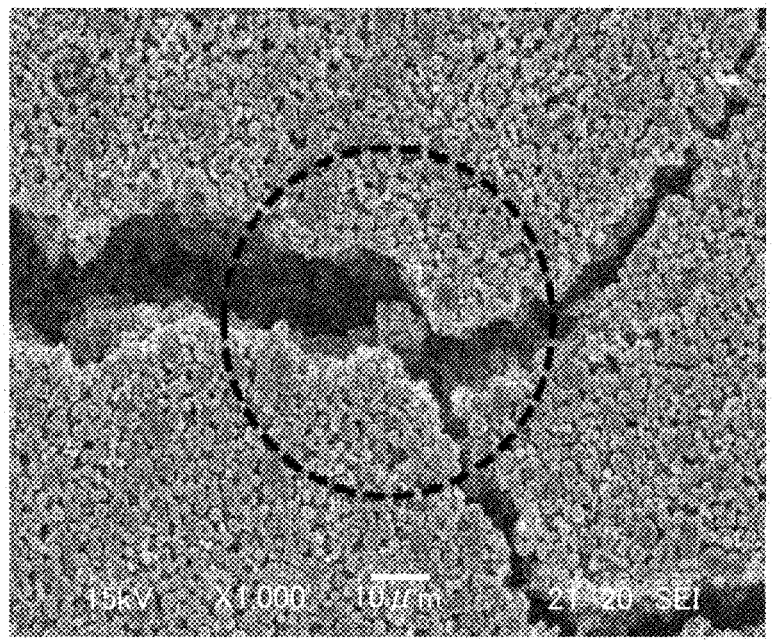
FIG. 8 is an image obtained by photographing with a scanning electron microscope (SEM) the surface of the sintered body of the electrode material produced in Comparative Example 1 and subjected to the bending strength evaluation test.
Figure 9:
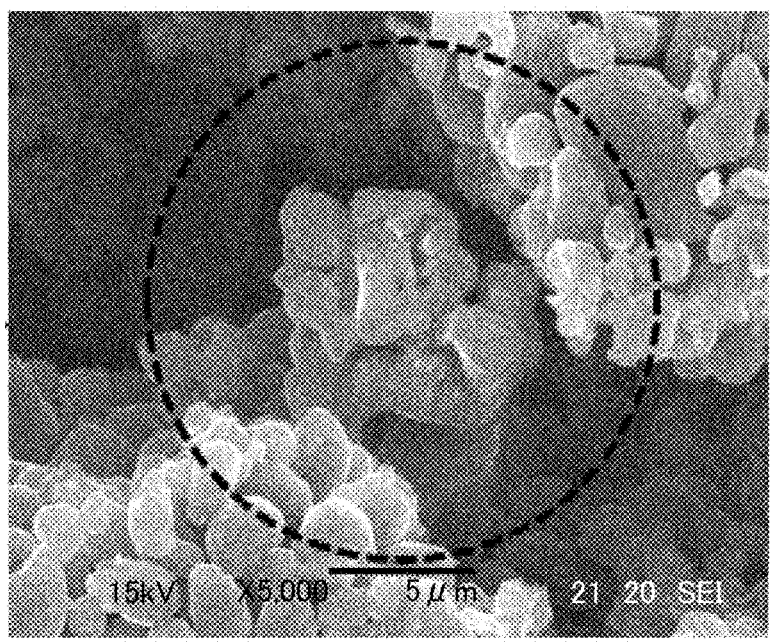
FIG. 9 is an image obtained by photographing with a scanning electron microscope (SEM) the surface of the sintered body of the electrode material produced in Comparative Example 1 and subjected to the bending strength evaluation test.
Figure 10:
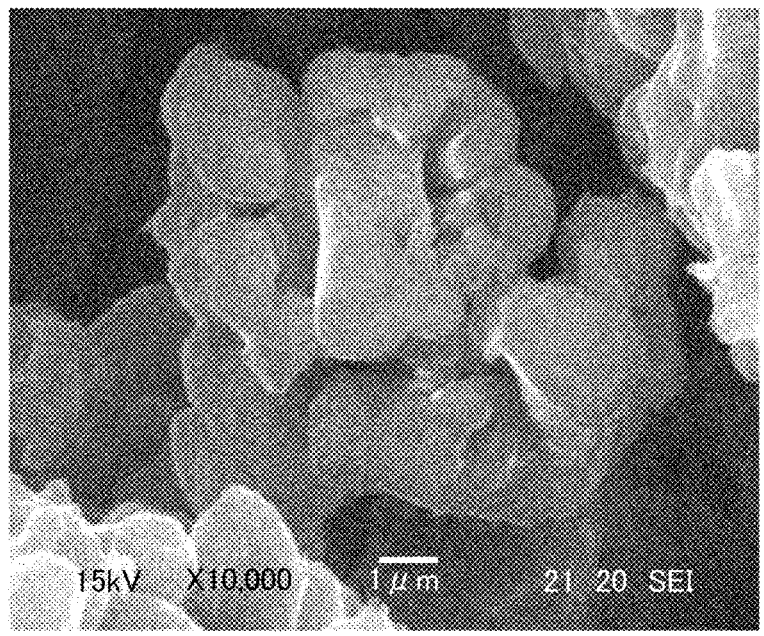
FIG. 10 is an image obtained by photographing with a scanning electron microscope (SEM) the surface of the sintered body of the electrode material produced in Comparative Example 1 and subjected to the bending strength evaluation test.

FIGS. 8 to 10 are images obtained by photographing with a scanning electron microscope (SEM) the surface of the sintered body of the electrode material produced in Comparative Example 1 and subjected to the bending strength evaluation test. FIGS. 8 to 10 show images of the portion in which cracking occurred. The images of FIGS. 8 to 10 show that secondary particles were formed by agglomeration of fine powder, and that the secondary particles served as a starting point of cracking. FIG. 8 also suggests that the secondary particles also affected the branch point of cracking.

Figure 11:
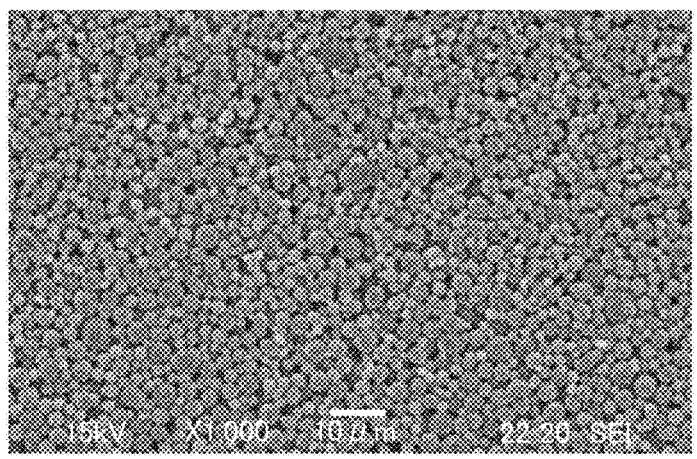
FIG. 11 is an image obtained by photographing the surface of the sintered body of the electrode material produced in Example 1 with a scanning electron microscope (SEM).
Figure 12:
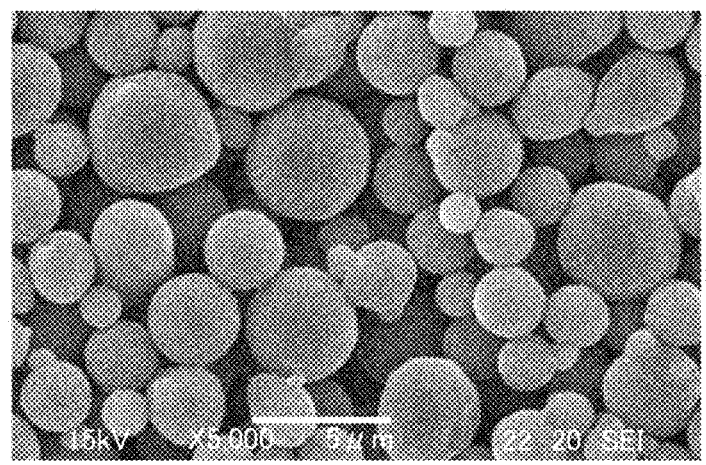
FIG. 12 is an image obtained by photographing the surface of the sintered body of the electrode material produced in Example 1 with a scanning electron microscope (SEM).

FIGS. 11 and 12 are images obtained by photographing the surface of the sintered body of the electrode material produced in Example 1 with an SEM. FIGS. 11 and 12 show a small amount of fine powder in the sintered body.

Figure 13:
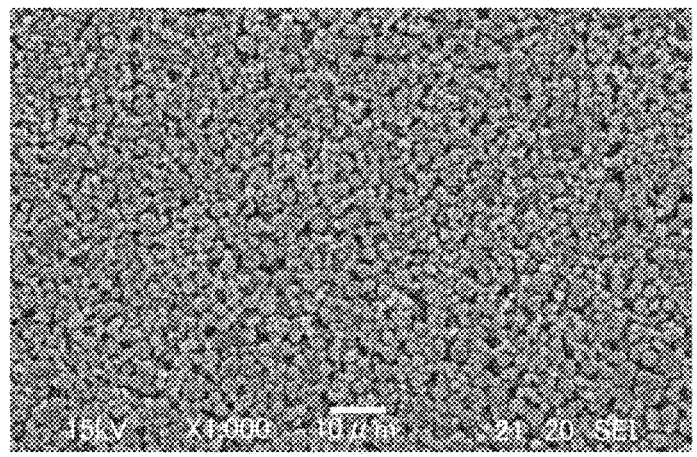
FIG. 13 is an image obtained by photographing the surface of the sintered body of the electrode material produced in Comparative Example 1 with a scanning electron microscope (SEM).
Figure 14:
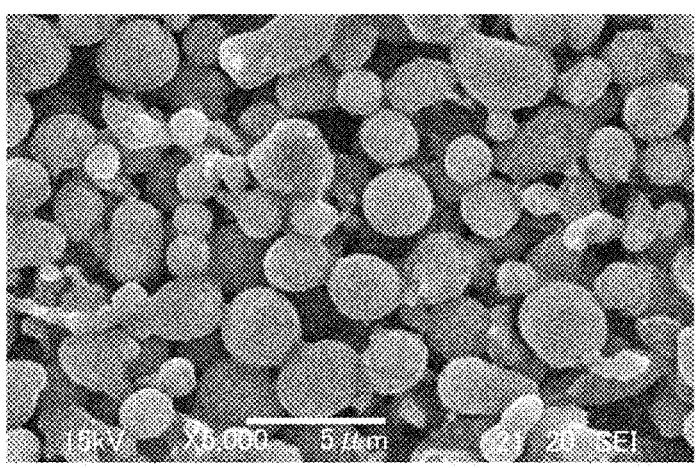
FIG. 14 is an image obtained by photographing the surface of the sintered body of the electrode material produced in Comparative Example 1 with a scanning electron microscope (SEM).
Figure 15:
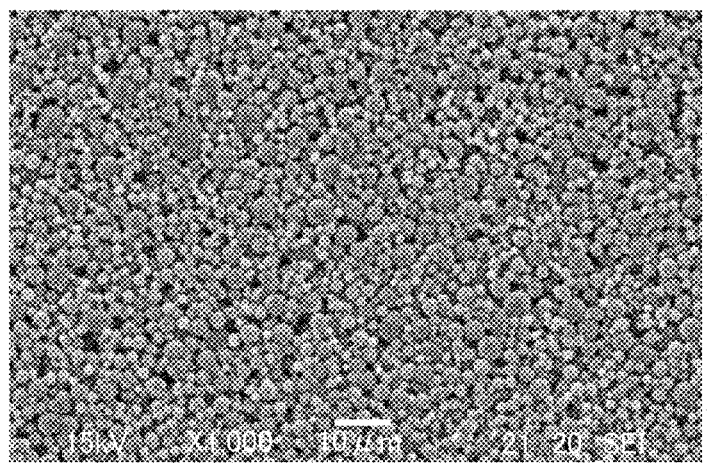
FIG. 15 is an image obtained by photographing the surface of the sintered body of the electrode material produced in Comparative Example 4 with a scanning electron microscope (SEM).
Figure 16:
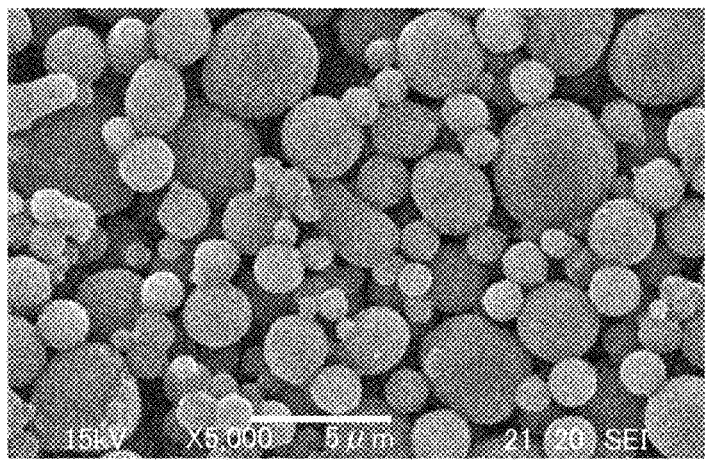
FIG. 16 is an image obtained by photographing the surface of the sintered body of the electrode material produced in Comparative Example 4 with a scanning electron microscope (SEM).

FIGS. 13 and 14 are images obtained by photographing the surface of the sintered body of the electrode material produced in Comparative Example 1 with an SEM. FIGS. 15 and 16 are images obtained by photographing the surface of the sintered body of the electrode material produced in Comparative Example 4 with an SEM. FIGS. 13 to 16 show a large amount of fine powder in the sintered body.

Figure 17:
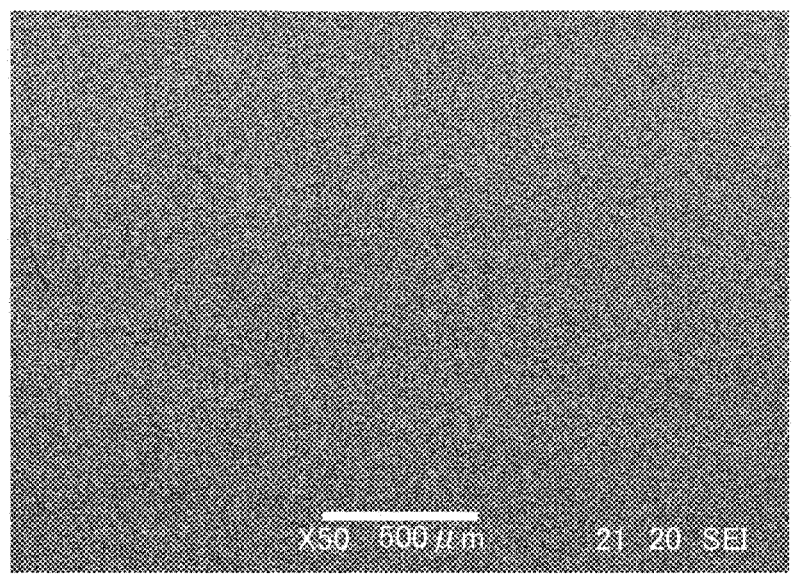
FIG. 17 is an image obtained by photographing with a scanning electron microscope (SEM) the surface of the sintered body of the electrode material produced in Example 1 and subjected to bending twice in the bending strength evaluation test.

FIG. 17 is an image obtained by photographing with a scanning electron microscope (SEM) the surface of the sintered body of the electrode material produced in Example 1 and subjected to bending twice, i.e., bending once and returned to the original position, in the bending strength evaluation test.

Figure 18:
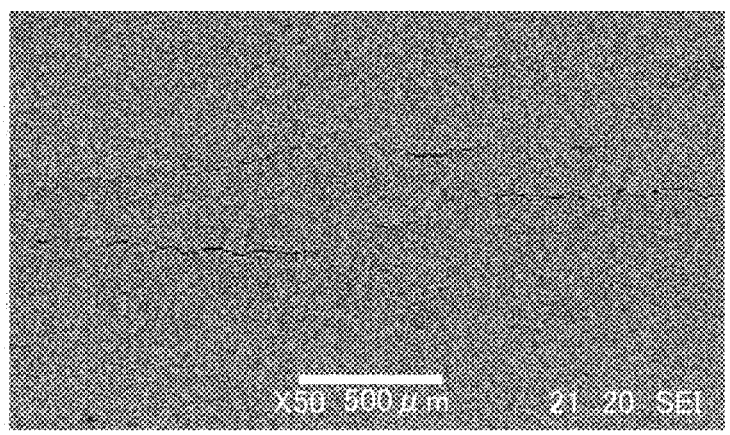
FIG. 18 is an image obtained by photographing with a scanning electron microscope (SEM) the surface of the sintered body of the electrode material produced in Comparative Example 1 and subjected to bending twice in the bending strength evaluation test.

FIG. 18 is an image obtained by photographing with a scanning electron microscope (SEM) the surface of the sintered body of the electrode material produced in Comparative Example 1 and subjected to bending twice in the bending strength evaluation test.

Figure 19:
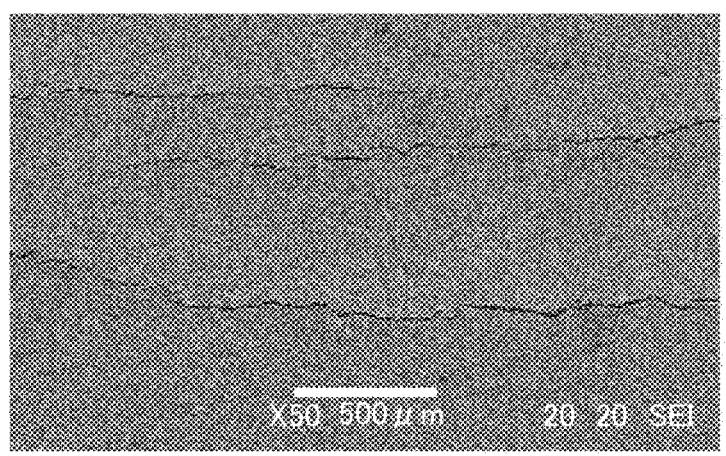
FIG. 19 is an image obtained by photographing with a scanning electron microscope (SEM) the surface of the sintered body of the electrode material produced in Comparative Example 5 and subjected to bending twice in the bending strength evaluation test.

FIG. 19 is an image obtained by photographing with a scanning electron microscope (SEM) the surface of the sintered body of the electrode material produced in Comparative Example 5 and subjected to bending twice in a bending strength evaluation test.

A comparison of FIGS. 17, 18, and 19 revealed that not only the number of bends until breakage occurred, but also the occurrence of cracking after bending is performed once, were different between the Example and Comparative Examples in which the lamination thicknesses were the same, indicating that the Example achieved excellent bending strength over the Comparative Examples.

The invention claimed is:

1. An electrode material for aluminum electrolytic capacitors, comprising a sintered body of at least one powder selected from the group consisting of an aluminum powder and an aluminum alloy powder on at least one surface of an aluminum foil substrate or an aluminum alloy foil substrate, wherein
   (1) the sintered body has a total thickness of 50 to 900 μm,
   (2) the powder in the sintered body has a 10% particle size $D_{10}$ in a number-based particle size distribution of 1.0 to 1.8 μm,
   (3) the powder in the sintered body has a 50% particle size $D_{50}$ in the number-based particle size distribution of 2.0 to 3.5 μm, and
   (4) the powder in the sintered body has a 90% particle size $D_{90}$ in the number-based particle size distribution of 3.8 to 6.0 μm.

2. The electrode material for aluminum electrolytic capacitors according to claim 1, wherein the number of powder particles having a particle size of 1 μm or less in a freely selected region of 100 μm×115 μm on the surface of the sintered body is 300 or less.

3. The electrode material for aluminum electrolytic capacitors according to claim 1, further comprising an anodic oxide film on the surface of the sintered body.

4. A method for producing an electrode material for aluminum electrolytic capacitors, comprising
   (1) step 1 of forming a film of a paste composition containing at least one powder selected from the group consisting of an aluminum powder and an aluminum alloy powder on at least one surface of an aluminum foil substrate or an aluminum alloy foil substrate, and
   (2) step 2 of sintering the film at a temperature of 560° C. or more and 660° C. or less, wherein
the powder has a 10% particle size $D_{10}$ in a number-based particle size distribution of 1.0 to 1.8 μm, a 50% particle size $D_{50}$ in the number-based particle size distribution of 2.0 to 3.5 μm, and a 90% particle size $D_{90}$ in the number-based particle size distribution of 3.8 to 6.0 μm.

5. The production method according to claim 4, further comprising an anodization step after step 2.

* * * * *